(12) United States Patent
Sivasankar et al.

(10) Patent No.: US 8,123,898 B2
(45) Date of Patent: Feb. 28, 2012

(54) METHODS OF BONDING OPTICAL STRUCTURES, BONDING AND SILYLATION OF OPTICAL STRUCTURES, BONDED OPTICAL STRUCTURES, AND SILYLATED BONDED OPTICAL STRUCTURES

(75) Inventors: Sanjeevi Sivasankar, El-Cerrito, CA (US); Steven Chu, Oakland, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1146 days.

(21) Appl. No.: 11/936,947

(22) Filed: Nov. 8, 2007

(65) Prior Publication Data

US 2011/0039094 A1 Feb. 17, 2011

Related U.S. Application Data

(60) Provisional application No. 60/950,354, filed on Jul. 18, 2007.

(51) Int. Cl.
 B32B 3/00 (2006.01)
 B32B 37/00 (2006.01)
 B32B 13/04 (2006.01)
 B32B 17/06 (2006.01)
 B32B 9/00 (2006.01)
(52) U.S. Cl. ........ 156/325; 428/332; 428/446; 428/428; 428/688; 428/701
(58) Field of Classification Search .............. 156/325; 428/332, 446, 428, 688, 701
See application file for complete search history.

(56) References Cited

U.S. PATENT DOCUMENTS 6,284,085 B1 * 9/2001 Gwo .................. 156/273.7
6,548,176 B1 * 4/2003 Gwo .................. 428/420

* cited by examiner

*Primary Examiner* — Kat Wyrozebski
*Assistant Examiner* — Daniel Lee
(74) *Attorney, Agent, or Firm* — Thomas, Kayden, Horstemeyer & Risley, LLP

(57) ABSTRACT

Methods of bonding optical structures, bonded optical structures, silylated bonded optical structures, and the like, are disclosed.

11 Claims, 6 Drawing Sheets

US 8,123,898 B2

METHODS OF BONDING OPTICAL STRUCTURES, BONDING AND SILYLATION OF OPTICAL STRUCTURES, BONDED OPTICAL STRUCTURES, AND SILYLATED BONDED OPTICAL STRUCTURES

CROSS-REFERENCE TO RELATED APPLICATION

This application claims priority to U.S. provisional application entitled, "Optical Bonding Using Silica Nanoparticles Sol-Gel Chemistry," having Ser. No. 60/950,354, filed on Jul. 18, 2007, which is entirely incorporated herein by reference.

STATEMENT REGARDING FEDERALLY SPONSORED RESEARCH OR DEVELOPMENT

This invention was made with Government support under Grant #: NSF (PHY-9970017) awarded by the National Science Foundation. The Government has certain rights in this invention.

BACKGROUND

Optical components are traditionally assembled using epoxy bonding, frit bonding, diffusion bonding, and optical contacting technologies. These bonding methods are limited by high bonding temperatures, low reliability, stringent requirements for surface flatness and cleanliness, complicated bonding protocols, low mechanical strength, and poor optical properties of the bonded interface. Some of these drawbacks are overcome by the technique of hydroxide catalysis bonding or silicate bonding which was first proposed by Gwo. In this bonding scheme, an alkaline bonding solution, typically sodium or potassium hydroxide or sodium silicate, is placed between the surfaces to be bonded. The $OH^-$ ions in the bonding solution etch the surfaces and form siloxane chains that bond the two surfaces. However the technique of hydroxide catalysis bonding has poor reproducibility and can only been used to bond substrates that satisfy stringent requirements of surface flatness and cleanliness.

SUMMARY

Briefly described, embodiments of this disclosure include methods of bonding optical structures, bonded optical structures, silylated bonded optical structures, and the like. One exemplary method of optical bonding two structures together, among others, includes: providing a first optical structure having a first surface, wherein the first surface has a surface oxide layer; providing a second optical structure having a second surface, wherein the second surface has a surface oxide layer; disposing a nanoparticle/hydroxide bonding mixture to at least one of the first surfaces of the first optical structure and the second optical structure; disposing the first optical structure adjacent the second optical structure so that at least one of the first surfaces of the first optical structure and the second optical structure having the nanoparticle/hydroxide mixture is in contact with the other first surface of the first optical structure and the second optical structure; and forming a bonding material layer between the first optical structure and the second optical structure to form a bonded optical structure under temperature conditions of about 15 to 30° C. In an embodiment, the method also includes silylating the bonded optical structure to form a silylated bonded optical structure.

One exemplary bonded optical structure, among others, includes: a first optical structure having a first surface, wherein the first surface has a surface oxide layer; a second optical structure having a second surface, wherein the second surface has a surface oxide layer; and a bonding material layer contacting each of the first surfaces of the first optical structure and the second optical structure, wherein the bonding material layer is formed from the curing of a nanoparticle/hydroxide bonding mixture. In an embodiment, the bonded optical structure surface is silylated to form a silylated bonded optical structure.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIG. 1(a) illustrates that the silica nanoparticles polymerize into a highly branched 3D-network and bond glass silica and quartz surfaces that do not have a perfect bonding-surface figure match. FIG. 1(b) illustrates that the nanoparticles bind together by siloxane linkages at a pH of greater than 10.7. Silicate ions are deposited at the junction between neighboring nanoparticles which further strengthens the network. FIG. 1(c) illustrates that the nanoparticles bind together via the reaction Nanoparticle-Si—OH+HO—Si-Nanoparticle→Nanoparticle-Si—O—Si-Nanoparticle+$H_2O$. Dehydration of the interface drives the reaction forward.

FIG. 5(a) and FIG. 5(c) are images of the center of the bonded slides while FIG. 5(b) and FIG. 5(d) are images of the edges. FIG. 5(a) illustrates slides bonded using the silica nanoparticles were defect free on most of the bonded region. Soda lime glass microscope slides were bonded using 25.5% w/v Luddox 5 nm silica nanoparticles suspended in a solution containing 10% v/v potassium silicate and 1M potassium hydroxide. FIG. 5(b) illustrates that most of the defects in the slides bonded using the silica nanoparticles were along the edges of the bonded slides (average 8 defects per 75 cm×25 cm bonded slide). FIG. 5(c) illustrates the surfaces joined using the silicate bonding method contained an average of 79 large circular defects all over the bonded region. Soda lime glass microscope slides were bonded using 100% solution of potassium silicate ($SiO_2/K_2O$ mole ratio 3.3). FIG. 5(d) illustrates that the slides joined using the silicate bonding method did not have defects at the edges.

FIG. 6(a) is an image of the center of the bonded slides while FIG. 6(b) is an image of the edge.

DETAILED DESCRIPTION

Figure 1:
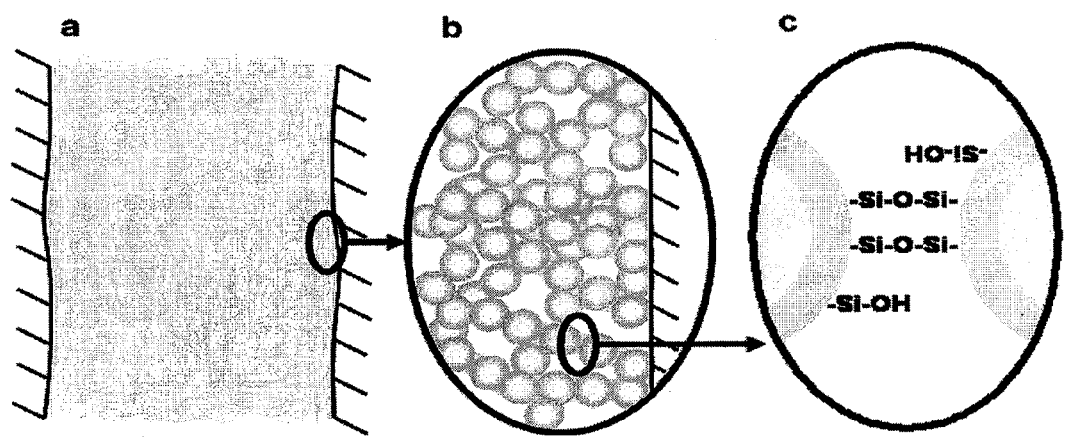
FIG. 1 illustrates a schematic of the bonded interface at different magnifications.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, inorganic chemistry, surface chemistry, material science, colloidal science, nanotechnology, physics, condensed matter physics, optics, optical physics and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight or stoichiometries by weight/volume (w/v) or volume/volume (v/v), temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

In this specification and in the claims that follow, reference will be made to a number of terms that shall be defined to have the following meanings unless a contrary intention is apparent.

The expression "silicate-like network" refers to a chemical-bond network similar to, but looser than, the bulk structure of silicon dioxide. In other words, the three-dimensional network is based on siloxane linkages or bridges (Si—O—Si) with each silicon atom serving as a center (e.g., a tetrahedral center) bonded to one or more oxygen atoms (e.g., four oxygen atoms in a tetrahedral center). However, the network is looser as compared with silicon dioxide, because it has more embedded and exposed silanol groups (Si—OH) and Si—$O^{M+}$ groups (where M+ denotes a cation) as local terminating groups of the network.

Silylation is the replacement of an acidic hydrogen on the compound with a less polar alkylsilyl group.

The quality of the optical surface is described by the Surface Flatness, Surface Quality/Polish and Power & Irregularity. Surface Flatness is the deviation for a plano surface from a test surface (typically an optical flat) and is defined in terms of wavelength. Typically, only values less than $\lambda/4$ are considered to be precision and values less than l/10 to be high precision. Surface Quality/Polish refers specifically to the cosmetic condition of an optical element's surface, such as a Scratch (any marking or tearing of the part surface) and DIG (a small rough spot on the part surface similar to a pit in appearance). The specification used for the maximum allowable flaws is denoted by a combination of numbers, the scratch number followed by the dig number; for example 60-40. The lower the number, the higher the level of quality. For example, a 60-40 value is common for research and industrial applications, whereas a 10-5 value represents a high quality standard for laser applications. Power and Irregularity. Power is used when dealing with a curved surface to define the deviation of the fabricated surface radius from the radius of an inversely shaped test plate. Irregularity is used to define how the surface deviates from the perfect shape of the test plate. This deviation is also known as surface figure. A power/irregularity ratio of 4/1 is an acceptable tolerance to meet in volume production.

General Discussion

Methods of bonding optical structures, bonded optical structures, silylated bonded optical structures, and the like, are described herein. In general, embodiments of the present disclosure are used to bond two or more optical substrates, where the optical substrates are used in optical applications, applications in jewelry, and the like. Embodiments of the methods of bonding optical structures can be conducted at room temperature to create bonded optical structures and silylated bonded optical structures that have a high bonding strength, few defects, high transmittance, and resistant to de-bonding upon exposure to solvents. In addition, the methods of the present disclosure can reproducibly produce bonded optical structures and silylated bonded optical structures.

Embodiments of the present disclosure include nanoparticle/hydroxide bonding mixtures that are used to bond two or more optical structures (e.g, glass slides) to one another. The nanoparticle/hydroxide bonding mixtures of the present disclosure include nanoparticles (e.g., silica nanoparticles) and one or more types of hydroxide ions (e.g., a mixture of NaOH and KOH). The bond-setting of the nanoparticle/hydroxide bonding mixture produces a bonding material layer between the optical structures at room temperature. After bond-setting of the nanoparticle/hydroxide bonding mixture, a bonded optical structure is produced (e.g., 12 or more hours). Subsequently, a silylated bonded optical structure can be produced via a silylating process.

Embodiments of the present disclosure are advantageous for at least the following reasons. In particular, embodiments of the present disclosure are advantageous as compared to other techniques such as optical adhesives, optical cements, optical epoxies, optical glues, glass frits, diffusion bonding, optical contacting, silicate bonding and traditional hydroxide-catalysis bonding technologies. It should be noted that one or more of optical adhesives, optical cements, optical epoxies, optical glues, glass frits, diffusion bonding, optical contacting, silicate bonding and traditional hydroxide-catalysis bonding technologies, can be referred to by another name or term, but it is intended that these are to be included within these terms as known by one of skill in the art.

First, embodiments of the present disclosure do not require any clean room facilities unlike optical contacting, diffusion bonding, and hydroxide-catalysis bonding, which are performed in clean rooms to avoid particulate contamination. Second, embodiments of the present disclosure are conducted at room temperature unlike frit bonding and diffusion bonding, which are carried out at high temperatures where optical coatings and surface flatness can be compromised and materials can be thermally stressed. Third, the bonded optical structure has less scattering than optical adhesives. Fourth, the bonding is very reproducible unlike optical contacting and hydroxide catalysis bonding. In an embodiment, using a $OH^-/SiO_2$ molar ratio above 0.35 can achieve 100% successful bonding rates between soda-lime glass slides. Fifth, the time required for bond setting can be tailored by controlling the concentration of the nanoparticles and hydroxyl ions to allow a precise optical alignment. Sixth, the bonded optical structure has a high mechanical strength. After curing the bond for 300 hours, the tensile strength of the interface exceeds 14 MPa. Seventh, unlike optical cements, the bonding is resistant to organic solvents on silylation with hydrophobic surface groups. Optics bonded with silica nanoparticles can thus be cleaned with organic solvents like acetone and ethanol. The bond layer formed using the silica nanoparticles is thicker than optical contacting and direct sol-gel bonding.

The bonded optical structure includes at least a first optical structure and a second optical structure. Each of the first and second optical structures includes a first surface that can form a three dimensional network of bonds that bond the first surface of the first substrate to the first surface of the second substrate. The three dimensional network of bonds include linkages or bridges between/among the nanoparticles, the first optical substrate, and/or the second optical substrate. In particular, the three dimensional network of bonds include: nanoparticle-linkage-nanoparticle bonds, nanoparticle-linkage-first surface of the first structure bonds, nanoparticle-linkage-first surface of the second structure bonds, the first surface of the first structure-linkage-first surface of the second structure bonds, and combinations thereof. The curing of the nanoparticle/hydroxide bonding mixture disposed between the first and second optical substrates forms a network of bonds among the nanoparticles and the first surfaces of the first and second structure. The nanoparticles can fill in microscopic pores, voids, and/or irregularities in the first surface of one or both of the first and second optical structures. In addition, the three dimensional network may extend into a pore of the first and/or second optical substrate and act as an anchor (e.g., physical adherence using electrostatic forces, electro dynamic forces, covalent bonds, ionic bonds, hydrogen bonds, van der Waals' bonds, combinations thereof, and the like) to the substrate. In addition, the surfaces of the bonded optical structure can be silylated to form a silylated bonded optical structure so that the bonded optical structure is resistant to de-bonding upon exposure to solvents (e.g., organic solvents). It should be noted that three or more optical structures can be bonded sequentially or at the same time.

In an embodiment, the three dimensional network of bonds include siloxane linkages or bridges (Si—O—Si) between/among the silica nanoparticles, the first optical substrate, and/or the second optical substrate. In particular, the three dimensional network of bonds include: silica nanoparticle-Si—O—Si-silica nanoparticle bonds, silica nanoparticle-Si—O—Si-first surface of the first structure bonds, silica nanoparticle-Si—O—Si-first surface of the second structure bonds, and combinations thereof. The linkage ((—Si(OH)$_2$—O—(Si(OH)$_2$)$_n$—OH) can include a variable number of Si(OH)$_2$ groups. In other words, the curing of the silica nanoparticle/hydroxide bonding mixture disposed between the first and second optical substrates forms a silicate-like network among the silica nanoparticles and the first surfaces of the first and second structure. In addition, the three dimensional network may extend into a pore of the first and/or second optical substrate and act as an anchor (e.g., physical adherence using electrostatic forces, hydrogen bonds, van der Waals' bonds, combinations thereof, and the like) to the substrate.

In another embodiment, the three dimensional network of bonds include covalent linkages or bridges (Al—O—Al) between/among the sapphire nanoparticles, the first optical substrate, and/or the second optical substrate and covalent linkages or bridges (Al—O—Si) or (Si—O—Al) between/among a mixture of sapphire and/or silica nanoparticles, the first optical substrate (sapphire or silica), and/or the second optical substrate (sapphire or silica). In particular, the three dimensional network of bonds include: sapphire nanoparticle-Al—O—Al-sapphire nanoparticle bonds, sapphire nanoparticle-Al—O—Si-silica nanoparticle bonds, sapphire nanoparticle-Al—O—Al-first surface of the first structure bonds, sapphire nanoparticle-Al—O—Si-first surface of the first structure bonds, sapphire nanoparticle-Al—O—Al-first surface of the second structure bonds, sapphire nanoparticle-Al—O—Si-first surface of the second structure bonds and combinations thereof. In other words, the curing of the sapphire nanoparticle/hydroxide bonding mixture disposed between the first and second optical substrates forms a covalent network among the sapphire nanoparticles and the first surfaces of the first and second structure. In addition, the three dimensional network may extend into a pore of the first and/or second optical substrate and act as an anchor (e.g., physical adherence using electrostatic forces, hydrogen bonds, van der Waals' bonds, combinations thereof, and the like) to the substrate.

As mentioned above, the nanoparticle/hydroxide bonding mixtures of the present disclosure include nanoparticles (e.g., silica nanoparticles) and one or more types of hydroxide ions (e.g., NaOH and/or KOH).

The source of hydroxide ions can include a solution of an alkaline material. For example, the alkaline material can include, but is not limited to, sodium hydroxide, potassium hydroxide, calcium hydroxide, strontium hydroxide, ammonia water, sodium ethoxide, lithium hydroxide, rubidium hydroxide, cesium hydroxide, and combinations thereof. In particular, the source of hydroxide ions can include sodium hydroxide and/or potassium hydroxide. The OH concentration in the nanoparticle/hydroxide bonding mixture can be about 1M to 6M. It should be noted that the OH concentration can vary as long as the molar ratio of [KOH]/[SiO$_2$] is >0.35). In an embodiment, the source of hydroxide is KOH or NaOH.

The nanoparticles can include, but are not limited to, soda-lime glass nanoparticles, borosilicate glass nanoparticles, lead crystal glass nanoparticles, silica glass nanoparticles, fused silica nanoparticles, fused quartz glass nanoparticles, alumina-based glass nanoparticles, sapphire nanoparticles, glass ceramic, phosphate glass nanoparticles, and combinations thereof. The diameter of the nanoparticles can be about 1 to 1000 nm, about 1 to 50 nm, about 1 to 25 nm, about 1 to 15 nm, about 2 to 10 nm, and about 2 to 8 nm. The silica nanoparticle/hydroxide bonding mixture can include a uniform size of nanoparticles (e.g., 5 or 7 nm) or a range of sizes of nanoparticles (e.g., 5 and 7 nm). The nanoparticle concentration in the nanoparticle/hydroxide bonding mixture can be about 1% to 99%, 10% to 70%, 20% to 40%. In an embodiment, the nanoparticles are silica nanoparticles, the diameter of the silica nanoparticles is about 5 to 10 nm, and the nanoparticle concentration is about 20% to 40%.

Another embodiment is nanoparticle bonding with or without potassium silicate. The concentration of potassium silicate can vary from about 5% v/v to 30% v/v.

The molar ratio of OH$^-$/nanoparticle is about 0.1 to 5.0, about 0.2 to 0.3, and about 0.35 to 2.1. In an embodiment, the OH$^-$/silica nanoparticle is greater than 0.35.

Table 1 illustrates a number of exemplary embodiments.

TABLE 1

| Concentration of 5 nm nanoparticles (w/v) | Concentration of 7 nm nanoparticles (w/v) | Concentration of potassium silicate (v/v) | [KOH] (M) | [KOH]/[SiO$_2$] | Success Rate |
|---|---|---|---|---|---|
| 20 | 0 | 0 | 6.796 | 2.039 | 100% |
| 0 | 27.5 | 0 | 6.343 | 1.384 | 100% |
| 22.5 | 0 | 0 | 5.145 | 1.372 | 100% |
| 0 | 30.0 | 0 | 5.102 | 1.020 | 100% |
| 25 | 0 | 0 | 3.494 | 0.839 | 100% |
| 0 | 32.5 | 0 | 3.860 | 0.713 | 100% |
| 12.5 | 12.5 | 0 | 2.876 | 0.690 | 100% |
| 0 | 25 | 0 | 2.837 | 0.681 | 100% |
| 0 | 25 | 5 | 2.837 | 0.655 | 100% |
| 0 | 25 | 10 | 2.837 | 0.631 | 100% |
| 0 | 25 | 15 | 2.837 | 0.608 | 100% |
| 0 | 25 | 20 | 2.837 | 0.587 | 100% |
| 0 | 25 | 25 | 2.837 | 0.567 | 100% |
| 12 | 18 | 5 | 2.189 | 0.424 | 100% |
| 0 | 30 | 0 | 2.102 | 0.420 | 100% |
| 0 | 36 | 0 | 2.122 | 0.354 | 100% |
| 22.5 | 0 | 20 | 1.348 | 0.305 | 100% |
| 0 | 34 | 0 | 1.715 | 0.303 | 100% |
| 0 | 26 | 30 | 1.391 | 0.261 | 100% |
| 15 | 14.25 | 10 | 1.246 | 0.239 | 100% |
| 0 | 30 | 20 | 1.304 | 0.230 | 100% |
| 0 | 34 | 10 | 1.016 | 0.169 | 100% |
| 6 | 26 | 10 | 1.228 | 0.217 | 83% |
| 25.5 | 0 | 10 | 1.266 | 0.276 | 82% |
| 9 | 22 | 10 | 1.234 | 0.224 | 78% |
| 19.5 | 0 | 30 | 1.429 | 0.336 | 75% |
| 0 | 32 | 10 | 1.810 | 0.319 | 67% |
| 15 | 14 | 10 | 1.245 | 0.241 | 67% |
| 28.5 | 0 | 0 | 0.984 | 0.207 | 67% |
| 0 | 34 | 10 | 1.216 | 0.203 | 67% |
| 16.5 | 12 | 10 | 1.248 | 0.246 | 50% |
| 12 | 18 | 10 | 1.240 | 0.232 | 50% |

TABLE 1-continued

| Concentration of 5 nm nanoparticles (w/v) | Concentration of 7 nm nanoparticles (w/v) | Concentration of potassium silicate (v/v) | [KOH] (M) | [KOH]/[SiO$_2$] | Success Rate |
|---|---|---|---|---|---|
| 3 | 30 | 10 | 1.222 | 0.210 | 50% |
| 0 | 34 | 0 | 0.9115 | 0.161 | 50% |
| 0 | 34 | 10 | 0.966 | 0.161 | 0% |
| 0 | 38 | 0 | 0.929 | 0.147 | 0% |
| 0 | 34 | 10 | 0.716 | 0.119 | 0% |
| 0 | 34 | 10 | 0.466 | 0.078 | 0% |

The results in Table 1 illustrate that the rate of successful bonding (column 6) depends on the OH$^-$/SiO$_2$ molar ratio (column 5). Between 3 and 10 pairs of glass slides were bonded using the 38 different bonding conditions described in this table with OH$^-$/SiO$_2$ ratios ranging from 0.05 to 1.5. Of the 38 bonding conditions, 13 conditions had 5 nm and/or 7 nm nanoparticles suspended in a solution of potassium hydroxide, while the remaining 25 bonding conditions had mixtures of 5 nm and/or 7 nm nanoparticles suspended in potassium silicate and potassium hydroxide. All of the 16 conditions with OH$^-$/SiO$_2$ molar ratios above 0.35 bonded successfully.

The optical structures can include structures that transmit, absorb and/or reflect electromagnetic radiation in the far UV, near UV, visible, near IR, and/or far IR ranges. The optical structures can include, but are not limited to, soda-lime glass, borosilicate glass, lead crystal glass, silica glass, fused silica, fused quartz glass, alumina-based glass, sapphire, glass ceramic, phosphate glass, opal, jade, and the like. The optical structures can include microscope slides, float glass slides, lenses, aspheric lenses, achromatic doublets, spherical lenses, cylindrical lenses, mirrors, mirror blanks, optical windows, diffusers, optical flats, prisms, optical filters, beam splitters, gratings, multi-element lens systems, micro lenses, micro optics, optical fibers, and any combination of the above.

The surface of the optical structures can be unpolished or polished defined by the associated scratch/dig. Polished surfaces range from a scratch/dig of 0/0 to 80/50.

In an embodiment, a bonded optical structure can include a first optical structure having a first surface and a second optical structure having a first surface. The first surface of each of the first optical structure and the second optical structure has a surface oxide layer. A bonding material layer contacting each of the first surfaces of the first optical structure and the second optical structure bonds the two optical structures to one another. The bonding material layer is formed from the curing of the silica nanoparticle/hydroxide bonding mixture. The bonding material layer includes a three dimensional network of bonds, as described above, that bond the first surface of the first substrate to the first surface of the second substrate to one another. In addition, the surfaces of the bonded optical structure can be silylated to form a silylated bonded optical structure so that the bonded optical structure is resistant to de-bonding upon exposure to solvents (e.g., organic solvents).

Embodiments of the present disclosure include methods of bonding two or more optical structures at temperatures of about 15 to 30° C. A first optical structure having a first surface and a second optical structure having a first surface are positioned adjacent one another. One or both of the first surfaces of the first optical structure and the second optical structure are coated with a nanoparticle/hydroxide bonding mixture. One of the first surfaces of the first optical structure or the second optical structure having the nanoparticle/hydroxide mixture is in contact with the other first surface of the first optical structure and the second optical structure. A bonding material layer is formed between the first optical structure and the second optical structure to form a bonded optical structure. The bonding material layer can be cured at temperatures of about 10 to 90° C. or about 5 to 30° C. after about 10 to 1000 hours (i.e., bond-setting time).

The bond-setting time can be controlled by adjusting the OH concentration, the concentration of nanoparticles, and combinations thereof. In this regard, the bond-setting time can be tailored to allow for precision optical alignment. The bond-setting time can be increased by decreasing the concentration of nanoparticles and vice versa. The bond-setting time can be increased by increasing the OH concentration or vice versa. Both of the concentration of nanoparticle and OH concentration can be adjusted to tailor the bond-setting time and other characteristics (e.g., bond strength, bonding rate, defects, scattering, transmittance, and the like) of the bonded optical structure.

The bonded optical structure can be formed at near 100% successful bonding rates. By controlling the stoichiometry of the silica nanoparticles and hydroxyl ions, 100% successful bonding rates are achieved. When the OH$^-$/SiO$_2$ molar ratio is greater than 0.35, the surfaces bond successfully 100% of the time. Additional details about some embodiments are provided in Table 1 and Example 1.

The strength of the bonded optical structure increases from 0.2 MPa after 1 hour to 8.5 MPa after 120 hours of bonding. The bond strength of the bonded optical structure is at least 3 MPa after curing for about 10 hours. After 300 hours, the tensile strength of the bonded interface cannot be determined since it exceeds the tensile strength of the epoxy used to hold the bonded surfaces on a force gauge (14 MPa). For comparison, the tensile strength of bulk silica is 50 MPa. Additional details about some embodiments are provided in Example 1.

The bonded optical structure had fewer defects relative to other bonding techniques. For example, a bonded optical structure that used a silica nanoparticles/hydroxide bonding mixture had fewer defects than silicate bonding techniques by an order of magnitude. The size of the defects are also an order of magnitude smaller than defects seen with silicate bonding. Additional details about some embodiments are provided in Example 1

The bonded optical structure scatters light directed at the bonded optical structure about the same as a bare glass slide. The intensity of the light scattering at various angles is about the same. In contrast, the intensity of the light scattering at various angles is anisotropic for structures bonded using optical epoxies. Additional details about some embodiments are provided in Example 1.

The bonded optical structure transmits about 99.6% of the light transmitted by a single bare glass slide that was cleaned using the same protocol. Additional details about some embodiments are provided in Example 1.

As mentioned above, the surfaces of the bonded optical structure can be silylated to form a silylated bonded optical structure. The silylated bonded optical structure is resistant to degradation (de-bonded) upon exposure (e.g., 12 hours of constant exposure) to organic solvents such as, but not limited to, acetone, ethanol, and combinations thereof.

The bonded optical structure can be silylated using a solution including hexamethylsilazane, silanes, and compounds that replace acidic hydrogens with a less polar functional group, for a time period of about 12 hours to 7 days at about 25 to 50° C. In an embodiment, the bonded optical structure was silylated using a solution including hexamethylsilazane (30%) in n-heptane for about 24 hours at about 50° C.

Embodiments of the present disclosure can be used to bond refractive and transmissive assemblies such as doublet and triplet lenses. It can also be used to splice optical fibers and bond lenses to optical fibers without optomechanical couplers. Since the bonding process is carried out at room temperatures, bond materials with different coefficients of thermal expansion can be bonded such as windows in Photo Multiplier tubes, lasers, x-ray tubes and vacuum tubes.

Embodiments of the present disclosure can be used in high power/laser applications and with ultraviolet light. Since the bonding interface of the present disclosure is inorganic and contains no organic bonding agents, it is not susceptible to pyrolysis and photolysis.

Embodiments of the present disclosure can be used in microelectromechanical (MEMS) and optical-MEMS applications. MEMS devices like pressure sensors, accelerometers, ink-jet printer heads, disk-drive heads, biosensors, optical switches and RF filters require hermetic device packaging to prevent the entry of moisture and other contaminants. To achieve a hermetic seal without damaging the MEMS device, a low out-gassing, room temperature bonding procedure is required. Embodiments of the present disclosure can be used to hermetically package MEMS and optical-MEMS devices.

Embodiments of the present disclosure can be used in scanning probe microscopy. In addition, embodiments of the present disclosure can be used to fuse micron sized substrates together particularly in applications that require clean surfaces with no surface or fluorescent contamination. Embodiments of the present disclosure can be used to bond microspheres and microparticles on cantilevers for atomic force microscopy, colloidal probe microscopy, and surface force measurements.

Embodiments of the present disclosure can be used in microfabrication. The silica nanoparticles could be electrostatically self assembled on a surface to form a patterned monolayer. This would allow the microfabrication of complicated three-dimensional structures in constrained geometries. Since the bonding layer can be made extremely thin, small optical, mechanical and electronic structures with submicrometer dimensions can be bonded. The bonding technology can also be used in microoptic assemblies.

Embodiments of the present disclosure can be used in underwater, chemistry and biological applications. The bonding in the present disclosure is chemically inert. Thus, embodiments of the present disclosure can be used for optical applications in underwater, chemical and biological environments.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

EXAMPLES

Now having described the embodiments of the present disclosure, in general, example 1 describes some additional embodiments of the present disclosure. While embodiments of present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Introduction:

A simple method is described to bond optical components using silica nanoparticle sol-gel chemistry. The silica nanoparticles polymerize into highly branched networks that link the surfaces together. The nanoparticle mediated bonding has several advantages to currently used optical joining technologies. The bonding is a room temperature process and does not require any clean room facilities. The bonded interface has a high mechanical strength and low scattering. The bonding is resistant to organic solvents on silylation with hydrophobic surface groups. This method can achieve 100% successful bonding rates between soda lime glass slides. The bond-setting time and be can tailored to allow time for precision optical alignment.

Discussion:

To overcome limitations of previous approaches, the technique of hydroxide catalysis bonding in conjunction with using silica nanoparticle sol-gel chemistry is used. This new technique includes the use of silica nanoparticles to fill in microscopic voids and irregularities and then the hydroxide catalysis is used to polymerize the particles into a branched, connected network (See FIG. 1). As a result, the silica-particle mediated bonding does not require the clean room facilities used in hydroxide catalysis bonding, diffusion bonding and optical contacting. Unlike hydroxide catalysis bonding and optical contacting the nanoparticle mediated bonding is very reproducible. By controlling the stoichiometry of the silica nanoparticles and hydroxyl ions, 100% successful bonding rates between soda lime glass slides can be achieved. The time required for bond setting can be tailored to allow precise alignment of the optics by controlling the concentration of the silica nanoparticles and hydroxyl ions. The bonding is a room temperature process, as opposed to diffusion bonding and glass frit bonding, which are carried out at high temperatures where optical coatings and surface flatness may be compromised and materials can be thermally stressed. The bonded interface has a high mechanical strength. After curing the bond for 300 hours, the tensile strength of the interface exceeds 14 MPa. Unlike optical cements, the bonding is resistant to organic solvents on silylation with hydrophobic surface groups. Optics bonded with silica nanoparticles and then silylated can be cleaned with organic solvents like acetone and ethanol.

When silica is exposed to water for an extended period of time, its surface gets hydroxylated and presents short protruding siloxane chains (—Si(OH)$_2$—O—Si(OH)$_2$—OH). These groups can chemically bond two perfectly flat fused-silica surfaces at room temperature. Since it is difficult to obtain a perfect bonding-surface figure match, the gap between the surfaces was filled with silica nanoparticles suspended in a potassium hydroxide solution that serves as an index matched filler material. The silica nanoparticles polymerize into highly branched 3D-networks that link the surfaces together (FIG. 1). The OH$^-$ ions in the bonding solution hydrolyze and etch the silica nanoparticles and the glass surfaces. As a result the surfaces liberate silicate ions and the pH of the bonding solution gradually decreases via the reaction $$SiO_2 + OH^- + 2H_2O \rightarrow Si(OH)_5^- \qquad (1)$$

FIG. 1 is a schematic of the bonded interface at different magnifications. FIG. 1(a) illustrates that the silica nanoparticles polymerize into a highly branched 3D-network and bond glass silica and quartz surfaces that do not have a perfect bonding-surface figure match. FIG. 1(b) illustrates that at pH <10.7, the nanoparticles bind together by siloxane linkages. Silicate ions are deposited at the junction between neighboring nanoparticles, which further strengthens the network. FIG. 1(c) illustrates that the nanoparticles bind together via the reaction: Nanoparticle-Si—OH+HO—Si-Nanoparticle→Nanoparticle-Si—O—Si-Nanoparticle+ H$_2$O. Dehydration of the interface drives the reaction forward.

Once the pH of the bonding solution decreases below 10.7, the nanoparticles bind together by siloxane linkages and form a three dimensional network that bond the surfaces (FIG. 1) via the reactions
Dehydration of the interface drives the reaction forward. The free silicate ions are deposited at the junction between neighboring nanoparticles, which further strengthens the network. Also the silicate ions disassociate to form Si(OH)$_4$, which polymerize to form siloxane chains. As the water evaporates and migrates into the bulk of the material, the network of nanoparticles and siloxane chains rigidly joins the surfaces (FIG. 1).

Figure 2:
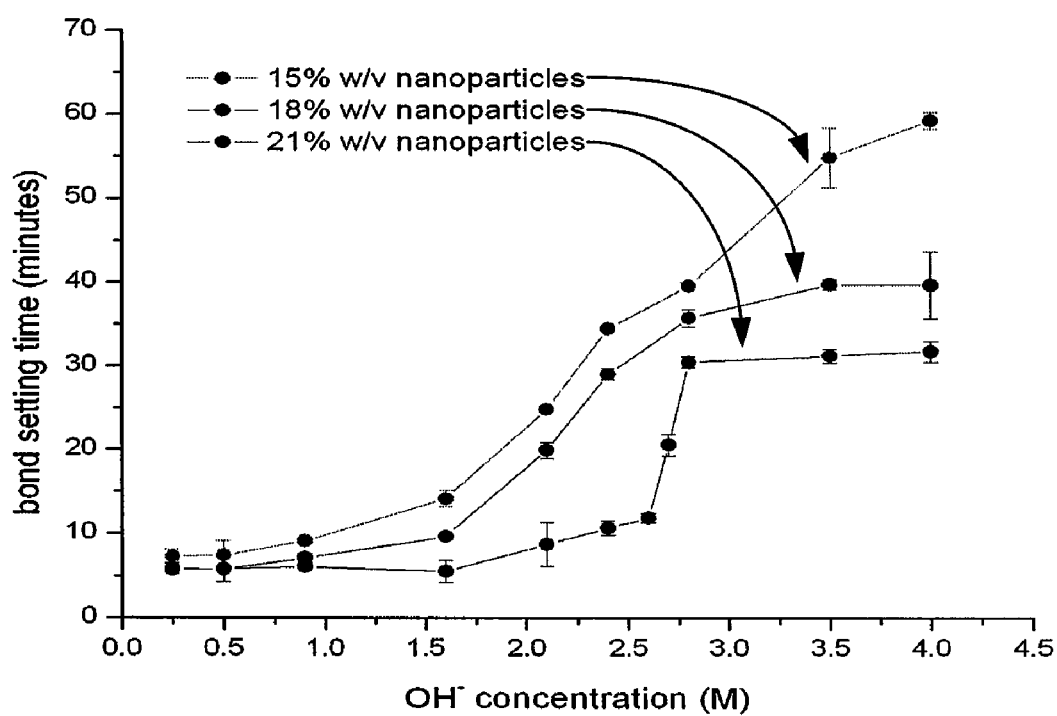
FIG. 2 illustrates that the bond-setting time increases with pH of the bonding solution and decreases with nanoparticle concentration. The bond setting times for soda lime glass microscope slides was measured for three different concentrations of Luddox 5 nm silica nanoparticles by putting 3 μl $cm^{-2}$ of bonding solution between the surfaces. As the bond formed, the glass slides were slightly perturbed at small time intervals until they became difficult to move.

The time required for bond setting can be altered by varying the concentrations of the silica nanoparticles and hydroxyl ions so that surfaces can be precisely aligned before the bond sets (FIG. 2). The OH$^-$ ions in the bonding solution etch the silica nanoparticles and the glass surfaces and the pH gradually decreases via equation 1. Since the silica nanoparticles polymerize at pH less than 10.7, increasing the initial pH of the bonding solution increases the bond setting time (FIG. 2). Similarly decreasing the nanoparticle concentration also increases the bond setting time (FIG. 2).

FIG. 2 illustrates that the bond setting time increases with pH of the bonding solution and decreases with nanoparticle concentration. The bond setting times for soda lime glass microscope slides was measured for three different concentrations of Luddox 5 nm silica nanoparticles by putting 3 µl cm$^{-2}$ of bonding solution between the surfaces. As the bonds form, the glass slides were slightly perturbed at small time intervals until they became difficult to move.

Figure 3:
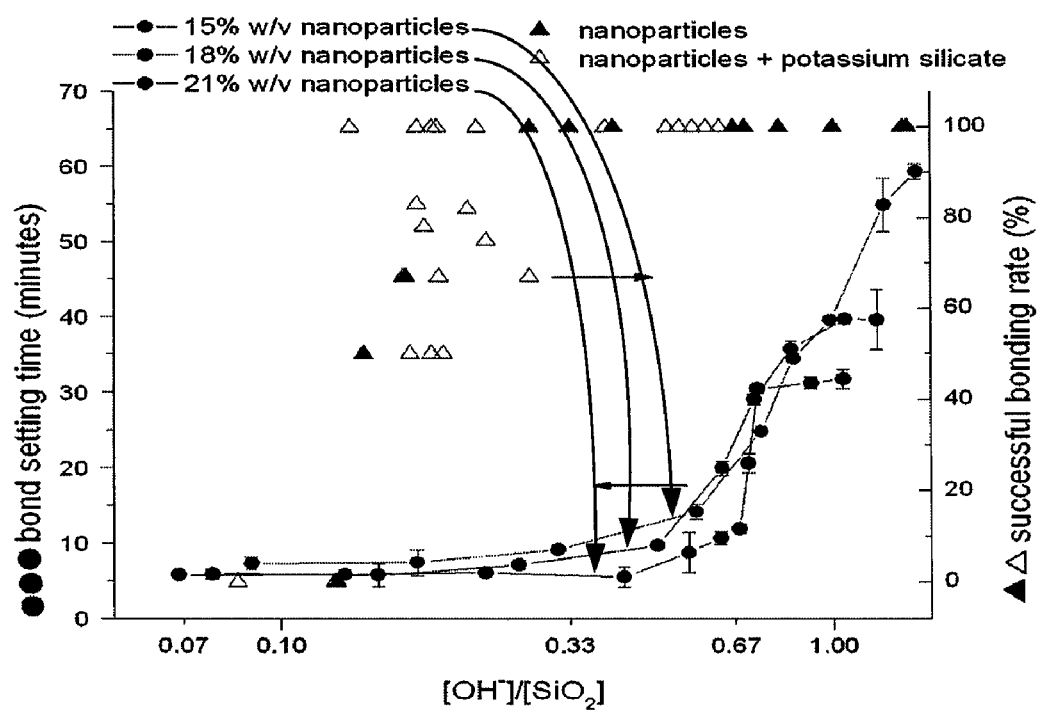
FIG. 3 illustrates that the rate of successful bonding (axis on the right) depends on the $OH^-/SiO_2$ molar ratio. Between 3 and 10 pairs of glass slides were bonded using 38 different bonding conditions with $OH^-/SiO_2$ ratios ranging from 0.05 to 1.5. Of the 38 bonding conditions, 13 conditions had 5 nm and/or 7 nm nanoparticles suspended in a solution of potassium hydroxide (filled triangles), while the remaining 25 bonding conditions had mixtures of 5 nm and/or 7 nm nanoparticles suspended in potassium silicate and potassium hydroxide (open triangles). All of the 16 conditions with $OH^-/SiO_2$ molar ratios above 0.35 bonded successfully (axis on the right). The bond setting times measured using 15% w/v nanoparticles, 18% w/v nanoparticles and 21% w/v nanoparticles suspended in a solution containing 10% v/v potassium silicate and potassium hydroxide are also plotted (axis on the left).

FIG. 3 illustrates that the rate of successful bonding (axis on the right) depends on the OH$^-$/SiO$_2$ molar ratio. Between 3 and 10 pairs of glass slides were bonded using 38 different bonding conditions with OH$^-$/SiO$_2$ ratios ranging from 0.05 to 1.5. Of the 38 bonding conditions, 13 conditions had 5 nm and/or 7 nm nanoparticles suspended in a solution of potassium hydroxide (filled triangles), while the remaining 25 bonding conditions had mixtures of 5 nm and/or 7 nm nanoparticles suspended in potassium silicate and potassium hydroxide (open triangles). All of the 16 conditions with OH$^-$/SiO$_2$ molar ratios above 0.35 bonded successfully (axis on the right). The bond setting times measured using 15% w/v nanoparticles, 18% w/v nanoparticles and 21% w/v nanoparticles suspended in a solution containing 10% v/v potassium silicate and potassium hydroxide are also plotted (axis on the left).

The nanoparticle bonding is very reproducible unlike optical contacting and hydroxide catalysis bonding. By controlling the stoichiometry of the silica nanoparticles and hydroxyl ions, 100% successful bonding rates between soda lime glass slides was achieved. When the OH$^-$/SiO$_2$ molar ratio is greater than 0.35, the surfaces bond successfully 100% of the time (Triangles in FIG. 3). Soda-lime glass slides were bonded using 38 different bonding conditions with OH$^-$/SiO$_2$ ratios ranging from 0.05 to 1.5. All of the 16 conditions with OH$^-$/SiO$_2$ molar ratios above 0.35 bonded successfully (FIG. 3).

Figure 4:
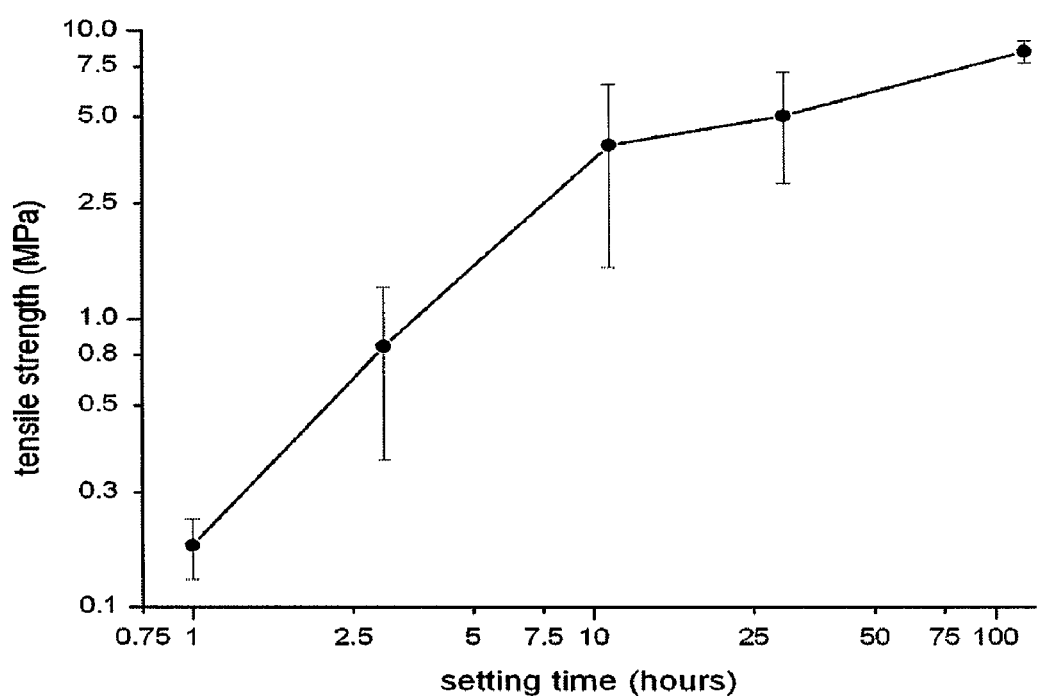
FIG. 4 illustrates the mechanical strength of the bonded interface increases with time. The tensile strength of the interface between soda lime glass cover-slips bonded using 12% w/v silica nanoparticles in a 10% v/v potassium silicate and 900 mM KOH solution was measured using a force gauge (Shimpo Instruments).

To test the strength of bonding, soda lime glass cover-slips were bonded using 5 nm silica nanoparticles and the tensile strength of the bonded interface was measured over a period of time (FIG. 4). The strength of the bonded interface increased from 0.2 MPa after 1 hour to 8.5 MPa after 120 hours of bonding (FIG. 4). After 300 hours, the tensile strength of the interface exceeds 14 MPa.

Figure 5:
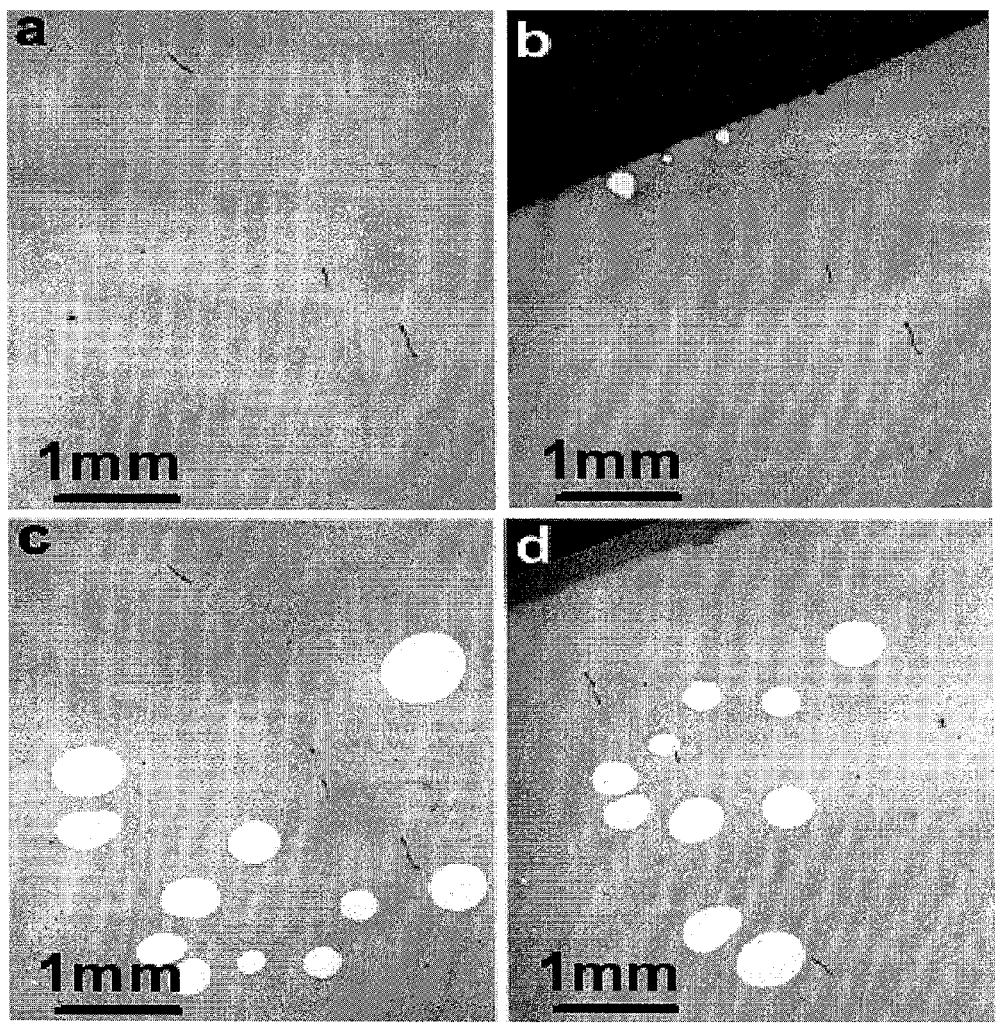
FIG. 5 illustrates bright-field images (7× magnification) of soda-lime glass slides bonded using nanoparticle mediated bonding (FIG. 5(a)), (FIG. 5(b)) and silicate bonding (FIG. 5(c)), (FIG. 5(d)).

To quantify defects in the bonding interface, soda lime glass slides bonded using either silica nanoparticles or potassium hydroxide (1.6M and 2M) or potassium silicate (SiO$_2$/K$_2$O mole ratio 3.3) were compared. Slides joined using only a potassium hydroxide solution, did not bond. The surfaces that were joined using 100% potassium silicate contained 0.3 mm to 1 mm sized circular defects all over the bonded region. On the average, each bonded slide (25 cm×75 cm) had 79 such defects (figure in supplementary materials). On the other hand, the slides bonded using the silica nanoparticles contained only 8 small defects, mostly along their edges (FIG. 5 as described in supplementary materials). These defects were approximately an order of magnitude smaller than the defects seen with the silicate bonding technique.

FIG. 4 illustrates the mechanical strength of the bonded interface increases with time. The tensile strength of the interface between soda lime glass cover-slips bonded using 12% w/v silica nanoparticles in a 10% v/v potassium silicate and 900 mM KOH solution were measured using a force gauge (Shimpo Instruments).

The smallest number of defects was obtained when the bonding solution contained nanoparticles, potassium hydroxide and between 5% v/v to 20% v/v potassium silicate. In the absence of potassium silicate, the number of defects in the bonded surface increased to 18 per slide (25 cm×75 cm). On the other hand, when the potassium silicate concentration was increased to 30% v/v, there were on the average 22 defects per bonded slide.

To test the optical quality of the bonding, the scattering and transmittance of surfaces bonded using 25.5% w/v silica nanoparticles suspended in a solution containing 10% v/v potassium silicate and 1M potassium hydroxide was measured and compared to the light scattered from surfaces bonded with Norland-63, a commercial optical adhesive. The intensity of light scattered from the nanoparticle bonded surface was roughly identical at all four angles (+45°, +30°, −30° and −45°). The surfaces scattered 60%, 75%, 73%, and 65% more light at these angles than a bare glass slide. On the other hand, the slides bonded using Norland-63 scattered light more anisotropically. These surfaces scattered 49%, 205%, 148%, and 40% more light than a bare glass slide at +45°, +30°, −30°, and −45°, respectively. The transmittance of the bonded surfaces was measured using a spectrophotometer. Between 400 nm and 900 nm, the slides bonded with the silica nanoparticles transmitted 99.58%±0.24% of the light transmitted by a single bare glass slide cleaned using the same protocols as the nanoparticle bonded slides.

A practical optical bonding technique must also be chemically resistance to organic solvents routinely used to clean optical components. However nanoparticle bonded glass slides exposed to acetone and ethanol, partially de-bonded within 1 hour. Although not intending to be bound by theory, this may have happened do to capillary action that pulls acetone and ethanol into the nanoparticle network that bond the surfaces together. The capillary pressure exerted on the nanometer sized pores in the network can reach hundreds of bars, and the network collapses irreversibly. This effect was previously implicated in the collapse of silica aerogels dried at ambient pressure. If the bonding interface were functionalized with hydrophobic molecules, the amount of liquid pulled in the nanoparticle network and the capillary pressure across the network pores would be reduced. The nanoparticle network was modified by silylating the bonded glass slides with a 30% solution of hexadimethylsilazane in n-heptane for 24 hours at 50° C. The silylated surfaces remained well bonded and defect free after a 12 hour exposure to acetone and ethanol.

In conclusion, a simple method to bond glass, silica, and quartz using silica nanoparticle sol-gel chemistry is described.

This technique has several advantages compared to optical adhesives, glass frits, diffusion bonding, optical contacting, and traditional hydroxide-catalysis bonding technologies. (1) The nanoparticle bonding does not require any clean room facilities unlike optical contacting, diffusion bonding and hydroxide-catalysis bonding, which are performed in clean rooms to avoid particulate contamination. (2) The nanoparticle bonding is a room temperature process unlike frit bonding and diffusion bonding, which are carried out at high temperatures where optical coatings and surface flatness can be compromised and materials can be thermally stressed. (3) The bonded interface has less scattering than optical adhesives. (4) The nanoparticle bonding is very reproducible unlike optical contacting[1] and hydroxide catalysis bonding. By using $OH^-/SiO_2$ molar ratio above 0.35 we achieve 100% successful bonding rates between soda-lime glass slides. (5) The time required for bond setting can be tailored by controlling the concentration of the silica nanoparticles and hydroxyl ions to allow a precise optical alignment. (6) The bonded interface has a high mechanical strength. After curing the bond for 300 hours, the tensile strength of the interface exceeds 14 MPa. (7) Unlike optical cements, the bonding is resistant to organic solvents on silylation with hydrophobic surface groups. Optics bonded with silica nanoparticles can thus be cleaned with organic solvents like acetone and ethanol. The bond layer formed using the silica nanoparticles is thicker than optical contacting and direct sol-gel bonding and is less suitable for constructing optical systems with low mechanical dissipation such as gravitational wave detectors.

Supplemental Example Information

Procedure for cleaning the glass slides: Soda-lime glass slides were cleaned by heating them at 60° C. for 12 hours in a 30% $H_2O_2$:70% $H_2SO_4$ solution. After thoroughly rinsing the surfaces in deionized water, the slides were sonicated for 30 minutes first in a 1M potassium hydroxide solution and then in deionized water.

Procedure for bonding the glass slides: The bonding solution contained 5 nm and/or 7 nm Luddox silica nanoparticles suspended either in a solution of potassium hydroxide or suspended in solution of potassium silicate and potassium hydroxide (see main text for concentrations). 3 µl cm$^{-2}$ of the bonding solution was put between the cleaned glass slides and let them cure for at least 300 hours at room temperature. The bonding does not require any clean room facilities.

FIG. 5 illustrates bright-field images (7× magnification) of soda-lime glass slides bonded using nanoparticle mediated bonding (FIGS. 5(a) and 5(b)) and silicate bonding (FIGS. 5(c) and 5(d)). FIGS. 5(a) and 5(c) are images of the center of the bonded slides while FIGS. 5(b) and 5(d) are images of the edges.

FIG. 5(a) illustrates the slides bonded using the silica nanoparticles were defect free on most of the bonded region. Soda lime glass microscope slides were bonded using 25.5% w/v Luddox 5 nm silica nanoparticles suspended in a solution containing 10% v/v potassium silicate and 1M potassium hydroxide.

FIG. 5(b) illustrates most of the defects in the slides bonded using the silica nanoparticles were along the edges of the bonded slides (average 8 defects per 75 cm×25 cm bonded slide).

FIG. 5(c) illustrates that the surfaces joined using the silicate bonding method contained an average of 79 large circular defects all over the bonded region. Soda lime glass microscope slides were bonded using 100% solution of potassium silicate ($SiO_2/K_2O$ mole ratio 3.3).

FIG. 5(d) illustrates the slides joined using the silicate bonding method did not have defects at the edges.

The defects in the slides bonded using the silica nanoparticles were approximately an order of magnitude smaller than the defects seen with the silicate bonding technique.

Figure 6:
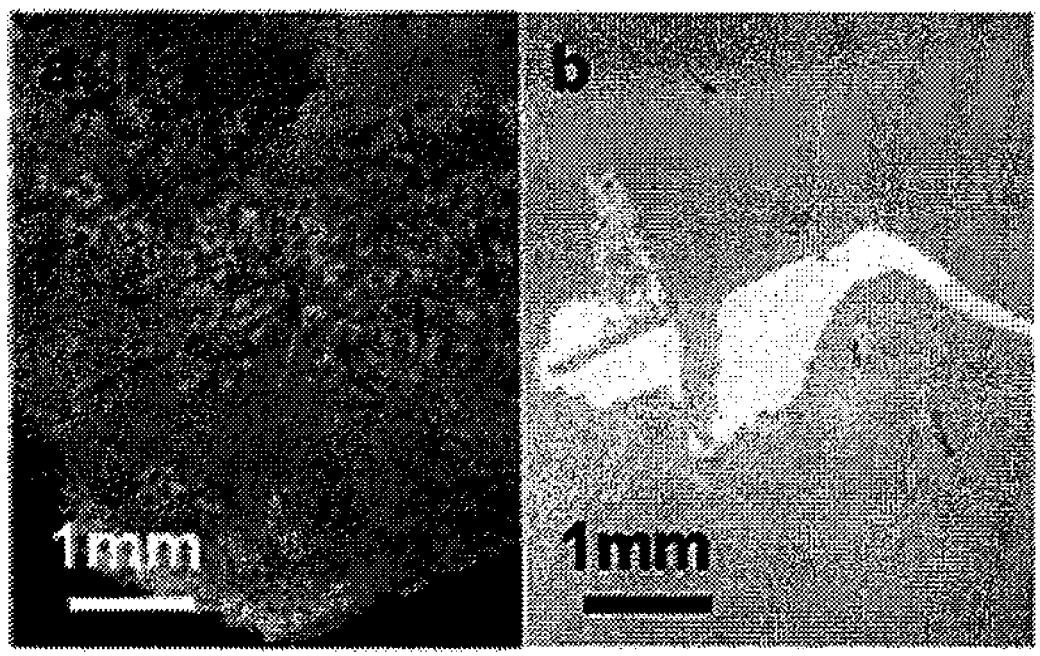
FIG. 6 illustrates bright-field images (7× magnification) of soda-lime glass slides bonded using 1.6M KOH. Slides joined using only a potassium hydroxide solution did not bond.

FIG. 6 illustrates bright-field images (7× magnification) of soda-lime glass slides bonded using 1.6M KOH. Slides joined using only a potassium hydroxide solution did not bond. FIG. 6(a) is an image of the center of the bonded slides while FIG. 6(b) is an image of the edge.

We claim:

1. A method of optically bonding two structures together, comprising:
    providing a first optical structure having a first surface, wherein the first surface has a surface oxide layer;
    providing a second optical structure having a second surface, wherein the second optical structure has a surface oxide layer;
    disposing a nanoparticle/hydroxide bonding mixture on at least one of the first surface of the first optical structure and the second surface of the second optical structure;
    disposing the first optical structure adjacent the second optical structure so that at least one of the first surface of the first optical structure and the second surface of the second optical structure having the nanoparticle/hydroxide mixture is in contact with the other of the first surface of the first optical structure and the second surface of the second optical structure;
    forming a bonding material layer between the first optical structure and the second optical structure to form a bonded optical structure under temperature conditions of about 15 to 30° C.; and silylating the bonded optical structure to form a silylated bonded optical structure.

2. The method of claim 1, wherein first optical structure and the second optical structure are each independently selected from: soda-lime glass, borosilicate glass, lead crystal glass, silica glass, fused silica, fused quartz glass, alumina-based glass, sapphire, glass ceramic, phosphate glass, opal, jade, and combinations thereof.

3. The method of claim 1, wherein the nanoparticle/hydroxide bonding mixture includes a plurality of nanoparticles and a hydroxide solution.

4. The method of claim 3, wherein the nanoparticles have a diameter of about 1 to 1000 nm.

5. The method of claim 3, wherein the nanoparticles have a uniform diameter from about 2 to 8 nm.

6. The method of claim 5, wherein the nanoparticle is a silica nanoparticle, and wherein the bonding material layer includes a three dimensional network of bonds that bond the first surface of the first optical substrate to the second surface of the second optical substrate, wherein the three dimensional network of bonds include: silica nanoparticle-Si—O—Si-silica nanoparticle bonds, silica nanoparticle-Si—O—Si-first surface of the first structure bonds, silica nanoparticle-Si—O—Si-first surface of the second structure bonds, and a combination thereof.

7. The method of claim 3, wherein the nanoparticle is selected from: silica nanoparticle, sapphire nanoparticle, and a combination thereof.

8. The method of claim 3, wherein the hydroxide solution is selected from: sodium hydroxide, potassium hydroxide, calcium hydroxide, strontium hydroxide, ammonia water, sodium ethoxide, lithium hydroxide, rubidium hydroxide, cesium hydroxide, and combinations thereof.

9. The method of claim 3, wherein the hydroxide solution is selected from: KOH, NaOH, or combinations thereof.

10. The method of claim 1, wherein the bonded optical structure is exposed to a solution including hexadimethylsilazane.

11. The method of claim 10, wherein the nanoparticle is a silica nanoparticle, and wherein the bonding material layer includes a three dimensional network of bonds that bond the first surface of the first optical substrate to the second surface of the second optical substrate, wherein the three dimensional network of bonds include: silica nanoparticle-Si—O—Si-silica nanoparticle bonds, silica nanoparticle-Si—O—Si-first surface of the first structure bonds, silica nanoparticle-Si—O—Si-first surface of the second structure bonds, and a combination thereof.

* * * * *